United States Patent [19]

Hayden

[11] Patent Number: 4,513,468

[45] Date of Patent: Apr. 30, 1985

[54] WINDSHIELD WIPER ELEMENT

[75] Inventor: William L. Hayden, Northville, Mich.

[73] Assignee: Ford Motor Company, Dearborn, Mich.

[21] Appl. No.: 520,881

[22] Filed: Aug. 5, 1983

[51] Int. Cl.³ ............................................. B60S 1/38
[52] U.S. Cl. ............................................. 15/250.36
[58] Field of Search ..................... 15/250.36–250.41

[56] References Cited

U.S. PATENT DOCUMENTS

| | | | |
|---|---|---|---|
| 2,589,339 | 3/1952 | Carson | 15/250.41 X |
| 3,048,872 | 8/1962 | Kerrigan | 15/250.36 |
| 3,566,432 | 3/1971 | Quinlan et al. | 15/250.41 X |
| 4,075,730 | 2/1978 | Siemund | 15/250.36 X |

FOREIGN PATENT DOCUMENTS 2069326  8/1981  United Kingdom ............. 15/250.36

*Primary Examiner*—Peter Feldman
*Attorney, Agent, or Firm*—Daniel M. Stock; Clifford L. Sadler

[57] ABSTRACT

An improved windshield wiper squeegee includes a convex teardrop shaped squeegee element which presents a surface of substantial radius in juxtaposition with a backing strip carrying the element. Alternative hollowed-out areas in the squeegee element enhance flexibility and resist icing.

2 Claims, 5 Drawing Figures

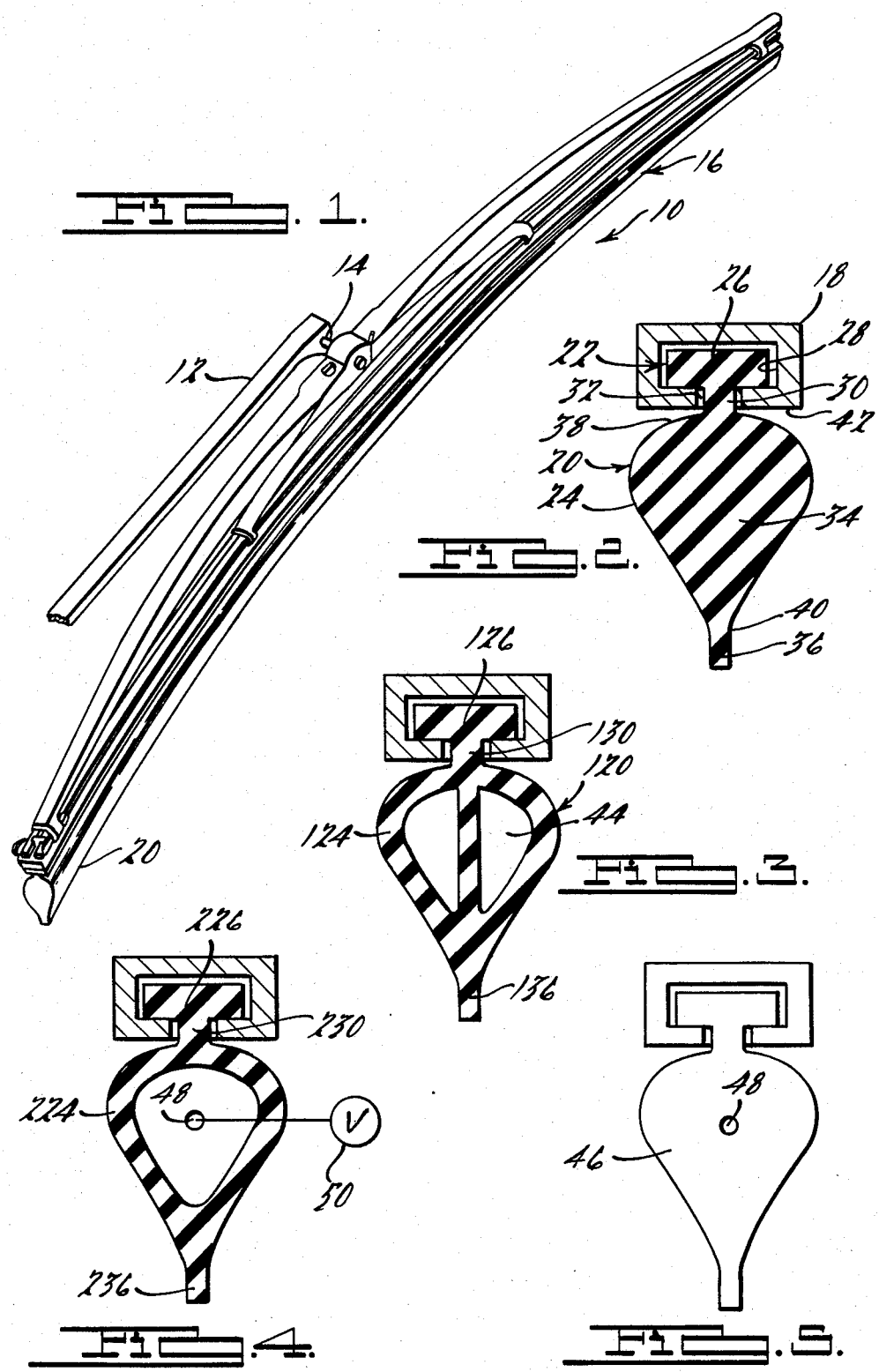

WINDSHIELD WIPER ELEMENT

BACKGROUND OF THE INVENTION

1. Field of the Invention

The present invention relates generally to windshield wipers and, more specifically, to the squeegee elements employed in windshield wiper blades.

2. Description of the Prior Art

The problems attendant to appropriate design of squeegee elements for windshield wipers are well known to those skilled in the art. Among the chief problems encountered are excessive noise, particularly during the reversing operation of the blades, freezing of the squeegee element to the window surface it is intended to wipe clear during inclement weather, permanent setting of elastomeric squeegees in one direction, and lack of consistency in friction and wipe quality characteristics of the squeegee elements. As an overriding concern, since these elements are frequently replaced by operators of motor vehicles, it is necessary that an economically manufacturable configuration be established for the squeegee element.

In the prior art, attempts have been made to reduce noise together with a tendency to permanent set of elastomeric squeegies through providing configurations which enhance the resiliency of the squeegee element. Exemplary of the prior art are U.S. Pat. Nos. 3,566,432 and 3,785,002 to Quinlan et al., and U.S. Pat. No. 3,428,997 to Rickett, as well as that element disclosed in U.S. Pat. No. 3,879,794 to Roberts, Jr. While the squeegee elements shown in these patents, as well as others available commercially, have had some success in improving resilience of the squeegee elements, it can be seen that they often involve the manufacture of rather complicated and expensive shapes and it has been determined that further improvements in noise reduction in the operation of the elements is desirable. Improvements are also desired in the area of resistance to permanent set and to freezing in inclement weather conditions, a problem which is particularly acute in those prior art elements which employ elongated external slots to increase element flexibility.

SUMMARY OF THE INVENTION

Responsive to the deficiencies in the prior art, the present invention provides a squeegee element for a windshield wiper system in which a simple teardrop cross-sectioned shape is provided for presenting a heavy section inherently resistant to permanent set and a generous radius is provided at one end of the teardrop section adjacent the portion of the squeegee element through which attachment to the driven backing strip of the windshield wiper system is effected. Provision of this radius has been found to reduce noise during reversing operation of the windshield wiper element. According to certain embodiments in the invention, one or more cavities are formed in the interior of the teardrop section to enchance the flexibility of the section, and according to another embodiment of the invention, means are provided for evacuating the central cavity for de-icing operation.

A BRIEF DESCRIPTION OF THE DRAWINGS

These and other features and objects of the invention will become apparent upon those skilled in the art upon reading the following description with reference to the accompanying drawing, in which like numerals refer to like parts throughout the several views, and in which:

FIG. 1 is a perspective view of a windshield wiper arm and blade assembly in which the squeegee element of the present invention is installed;

FIG. 2 is a cross-sectional view of the squeegee element of FIG. 1 shown installed in the backing strip of the windshield wiper assembly;

FIG. 3 is another cross-sectional view similar to FIG. 2 showing one alternative embodiment of the squeegee element of the present invention;

FIG. 4 is another cross-sectional view showing another alternative embodiment to the squeegee element of the present invention; and FIG. 5 is an end view of the squeegee element of the FIG. 4 embodiment.

DESCRIPTION OF THE PREFERRED EMBODIMENTS

Turning now to the drawings, and particularly to FIG. 1, a wiper arm and blade assembly 10 is shown which includes a wiper arm 12 which is connected in a known manner to an oscillating pivot shaft projecting from the body of an automobile for oscillating movement across the windshield of a motor vehicle (not shown). The wiper arm is connected as through a pin 14 to a wiper blade assembly 16. The precise configuration of the wiper blade assembly is not of importance to the present invention beyond the fact that some sort of backing strip 18 is carried with the wiper assembly 16 providing a structure for mounting a squeegee elements 20.

Turning now to FIG. 2, the squeegee element 20 of the present invention is illustrated as being integrally formed to include a generally T-shaped mounting portion 22 and a generally teardrop-shaped blade portion 24 having convex outer surfaces symmetrically arrayed about the stem portion. The mounting portion 22 includes a generally rectangular base portion 26 received in an elongated cavity 28 formed in the stay 18 and an outward extending stem portion 30 traversing an elongated slot 32 formed in the stay 18. The teardrop portion 24 includes an enlarged main body portion 34 and a generally rectangular in cross-section tip portion 36. Of primary importance in the formation of the teardrop portion 24 is the provision of a generous radius of curvature at the face 38 of the section through which connection is effected to the stem portion 30. The teardrop portion 24 is formed to define a pair of convex surfaces symmetrically arrayed about a vertical plane extending from the stem portion 30 through the tip portion 36. The centers of the radii of curvature of these surfaces fall on either side of the vertical plane; but in the area of the face 38 of each convex surface adjacent the stem portion 30, the radii of curvature are larger than those of the widest portion of the teardrop portion 24 and fall generally in the vertical plane. A smooth transition should also be formed at the transition between the teardrop section 24 and the tip portion 36 as indicated at 40 wherein a fillet is formed between the outer surfaces of the main body portion 34 and the tip portion 36. In testing performed with squeegee elements of the configuration shown in FIG. 1, it has been seen that the provision of the generous radius of curvature at 38 has a significant effect in reducing the noise attendant blade reversals upon operation of the oscillating shaft of the motor vehicle. Presenting the curved surface in juxtaposition to the adjacent face 42 of the backing strip 18 cushions the impact of the squeegee element 20 against the backing strip 18 as oscillating movement bends the element 20 about the stem portion 30. The enlarged section of the teardrop element 24 as compared to prior art elements as well as the provision of the smooth transition at 40 have been found to reduce the tendency of the element to take permanent set and to reduce and make more predictable frictional drag in the operation of the windshield wiper assembly 10. This latter effect occurs primarily because the enlarged section of the teardrop portion 24 of the element of the present invention resists the tendency of the element to lay over flat against the windshield to create a greater frictional surface. The convex configuration of the teardrop portion 24 resists this type of deformation and tends to minimize and predictably the contact area unlike elements taught by the prior art. Furthermore, the bulbous convex configuration of the main body portion 34 eliminates the external cavities of the prior art devices which tend to promote ice formation.

Turning now to FIG. 3, an alternative embodiment for the squeegee element of the present invention is shown in which like elements having like functions carry reference numerals identical to that of the FIGS. 1 and 2 preceded by the numeral 1. The element 120 of the FIG. 3 embodiment differs essentially from the element 20 of the FIG. 2 embodiment by the provision of a pair of elongated, shaped cores 44. These could be replaced by a single core. The provision of such core or cores tends to reduce the cost of the element through material removal and tends to enhance the flexibility of the element 120.

Turning lastly to the configuration of FIGS. 4 and 5 in which like elements having like functions are denoted by the reference numerals of FIGS. 1 and 2 preceded by the numeral 2, another alternative embodiment is shown which differs from the previous embodiments in that the central cavity 24 includes one end 46 pierced by a bleed orifice 48 so that if a vacuum source such as indicated schematically at 50 is applied to the cavity 244 of the element 220, the element can be flexed inwardly for de-icing.

While only three embodiments of the squeegee element of the present invention have been disclosed, others may be possible without departing from the scope of the appended claims.

I claim:

1. A squeegee element for a windshield wiper blade of the type having a rigid backing strip having a channel formed therein for mounting the squeegee element, the squeegee element being integrally formed from an elastomer to comprise:
    A. an elongated T-shaped mounting portion received in the backing strip channel including a unitary stem portion extending outwardly therefrom and a bullbous main body portion;
    B. a tip portion of substantially rectangular cross-section formed at the end of the main body portion remote from the stem portion;
    C. said main body portion being teardrop shaped in cross-section and having convex outer surfaces extending in the lateral direction and symmetrically arrayed about a vertical plane extending through the stem portion and the tip portion, said convex outer surfaces each having equal radii of curvature, and wherein convex upper surfaces are formed on each of the convex outer surfaces at locations adjacent the backing strip, each convex upper surface having a larger convex radius of curvature than the radii of curvature of said convex outer surfaces, the centers of the convex outer surfaces falling on either side of said vertical plane and the centers of the convex upper surfaces falling in the vertical plane; and
    D. means defining a smooth cross-sectional transition on the surface of the element between said main body portion and said tip portion.

2. A squeegee element as defined in claim 1 wherein said main body portion includes a core means for defining a cavity therein for enhancing the flexibility of the element.

* * * * *